United States Patent
Furuta (10) Patent No.: US 8,909,285 B2
(45) Date of Patent: Dec. 9, 2014

(54) MOBILE TERMINAL DEVICE AND CONTROLLING METHOD

(71) Applicant: Fujitsu Limited, Kawasaki-shi, Kanagawa (JP)

(72) Inventor: Daitarou Furuta, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 261 days.

(21) Appl. No.: 13/678,318

(22) Filed: Nov. 15, 2012

(65) Prior Publication Data
US 2013/0244721 A1    Sep. 19, 2013

(30) Foreign Application Priority Data
Mar. 15, 2012    (JP) .................................. 2012-059495

(51) Int. Cl.
*H04W 88/06*    (2009.01)
*H04W 36/14*    (2009.01)
(52) U.S. Cl.
CPC .............. *H04W 88/06* (2013.01); *H04W 36/14* (2013.01)
USPC ......................... 455/552.1; 455/436; 370/331
(58) Field of Classification Search
CPC ..... H04W 88/06; H04W 36/00; H04W 36/14; H04W 36/0066
USPC ................................ 455/552.1, 436; 370/331
See application file for complete search history.

(56) References Cited

U.S. PATENT DOCUMENTS

2006/0117218 A1    6/2006    Kitajima
2007/0081499 A1*   4/2007    Johnsen ....................... 370/335

FOREIGN PATENT DOCUMENTS

JP    2006-139621 A    6/2006
JP    2010-245888 A    10/2010

* cited by examiner

*Primary Examiner* — Raymond Dean
(74) *Attorney, Agent, or Firm* — Maschoff Brennan (57) ABSTRACT

A mobile terminal device includes a first processor and a second processor. The first processor executes a first process for communication using a first wireless scheme and outputs line setting information for the communication using the first wireless scheme before performing reset process when an interrupt request that triggers the reset process occurs in the first processor during the communication using the first wireless scheme. The second processor executes a second process for communication using a second wireless scheme and outputs a connection request for the communication using the second wireless scheme when the second processor acquires the line setting information from the first processor.

9 Claims, 7 Drawing Sheets

MOBILE TERMINAL DEVICE AND CONTROLLING METHOD

CROSS-REFERENCE TO RELATED APPLICATION

This application is based upon and claims the benefit of priority of the prior Japanese Patent Application No. 2012-059495, filed on Mar. 15, 2012, the entire contents of which are incorporated herein by reference.

FIELD

The embodiments disclosed herein are related to a mobile terminal device and a controlling method for the mobile terminal device.

BACKGROUND

So-called multi-mode terminals are being developed as mobile terminal devices that are connectable with a plurality of wireless schemes such as long term evolution (LTE) and wideband code divided multiple access (W-CDMA) schemes. A method called "fast redirection", for example, has been disclosed as a technology used for changeover among a plurality of wireless schemes.

A brief description of fast redirection will be given below.

In fast redirection, first, a mobile terminal device reports a connection request and wireless schemes supported by the mobile terminal device to a base station of the first wireless scheme.

Then, the base station of the first wireless scheme determines whether a second wireless scheme is included in the wireless schemes supported by the mobile terminal device, and whether a base station of the second wireless scheme is located near the base station of the first wireless scheme. If it is determined that there exists a base station of the second wireless scheme that satisfies the conditions, the base station of the first wireless scheme prohibits wireless connection with the mobile terminal device, and notifies the mobile terminal device of the center frequency of the transmission band of the base station of the second wireless scheme.

Then, the mobile terminal device detects the base station of the second wireless scheme by using the center frequency of the transmission band of which the mobile terminal device has been notified from the base station of the first wireless scheme. Then, the mobile terminal device establishes a connection in a wireless manner to the base station of the second wireless scheme.

In a multi-mode terminal according to an example of the related art, separate tasks in one processor are assigned to a plurality of wireless schemes. For this reason, if an interrupt that triggers reset processing occurs during communication, the communication will be stopped until the processor completes reset processing. In other words, although the mobile terminal device supports a plurality of wireless schemes, communication is stopped when a processor starts resetting. Communication reliability has not been ensured.

Japanese Laid-open Patent Publication No. 2010-245888 is an example of the related art.

SUMMARY

According to an aspect of the invention, a mobile terminal device includes a first processor and a second processor. The first processor executes a first process for communication using a first wireless scheme and outputs line setting information for the communication using the first wireless scheme before performing reset process when an interrupt request that triggers the reset process occurs in the first processor during the communication using the first wireless scheme. The second processor executes a second process for communication using a second wireless scheme and outputs a connection request for the communication using the second wireless scheme when the second processor acquires the line setting information from the first processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, one embodiment will be described below with reference to the accompanying drawings.

(Hardware of Mobile Terminal Device)

Figure 1:
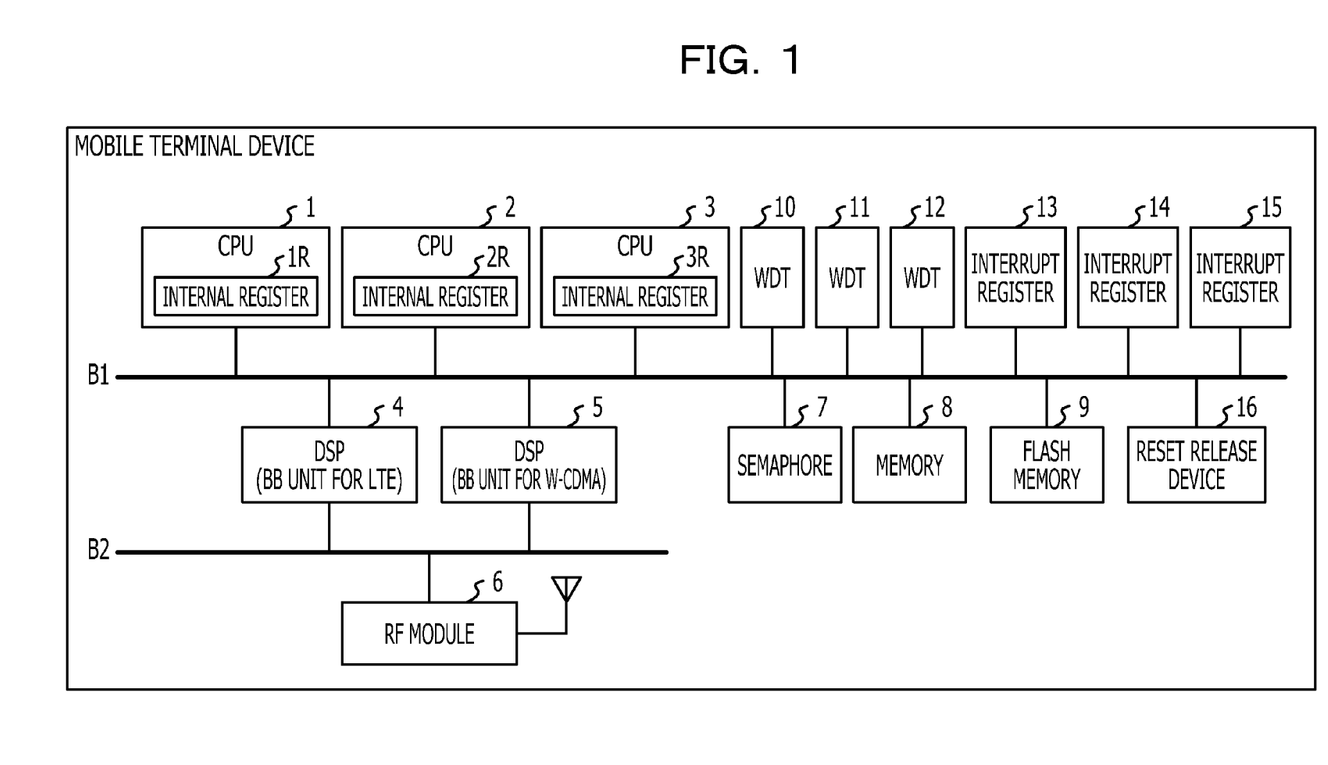
FIG. 1 is a schematic diagram of a hardware configuration of a mobile terminal device according to one embodiment.

FIG. 1 is a schematic diagram of a hardware configuration of a mobile terminal device according to one embodiment.

As illustrated in FIG. 1, the mobile terminal device according to this embodiment includes a central processing unit (CPU) 1, a CPU 2, a CPU 3, a digital signal processor (DSP) 4, a DSP 5, a radio frequency (RF) module 6, a semaphore 7, a memory 8, a flash memory 9, a watchdog timer 10, a watchdog timer 11, a watchdog timer 12, an interrupt register 13, an interrupt register 14, an interrupt register 15, and a reset release device 16. Note that the watchdog timers 10, 11, and 12 correspond to WDT 10, WDT 11, and WDT 12 in the drawing, respectively.

The CPU 1, the CPU 2, the CPU 3, the DSP 4, the DSP 5, the semaphore 7, the memory 8, the flash memory 9, the watchdog timer 10, the watchdog timer 11, the watchdog timer 12, the interrupt register 13, the interrupt register 14, the interrupt register 15, and the reset release device 16 are mutually connected, for example, through a main bus B1. The DSP 4, the DSP 5, and the RF module 6 are mutually connected, for example, through a local bus B2.

Each of the CPUs 1 to 3 reads various programs stored in the flash memory 9 and loads them into the memory 8, and executes various programs loaded in the memory 8, thereby implementing various functions.

The CPUs 1 to 3 are all in the same hardware configuration, and include control devices (not illustrated), arithmetic-logic units (not illustrated), internal registers 1R, 2R, and 3R, and other components, respectively. The internal registers 1R, 2R, and 3R store a storage location address "PGxxxxx(h)" (described later) in the memory 8 of a rendezvous program. The rendezvous program will be executed when one of the CPUs 1 to 3 is started as a spare CPU.

Each of the DSPs 4 or 5 implements a base band signal processing unit, for example, by executing a program loaded in the memory 8. Note that, in this embodiment, the DSP 4 implements a base band processing unit for LTE, and the DSP 5 implements a base band signal processing unit for W-CDMA.

Both the DSPs 4 and 5 according to this embodiment are built in such a manner as to be able to operate independently of the CPUs 1 to 3. For this reason, when the CPUs 1 to 3 start reset processing, for example, the reset processing exerts no influence on the DSPs 4 and 5.

Note that, while the DSPs 4 and 5 implement base band processing units on the basis of a program loaded in the memory 8, the present disclosure is not limited to this. For example, each of the DSPs 4 and 5 may implement a base band signal processing unit on the basis of a program loaded in a memory (not illustrated) built in each of the DSPs 4 and 5 itself. In addition, programs to be executed by the DSPs 4 and 5 may be stored in a flash memory prepared separately from the flash memory 9.

The semaphore 7 increments a semaphore count N by one when an acquisition operation (so-called P operation) is performed by any of the CPUs 1 to 3. The initial value of the semaphore count N is not particularly limited, and is set to "0" in this embodiment. Moreover, each time an acquisition operation is performed by any of the CPUs 1 to 3, the semaphore count N is incremented in this embodiment; instead of this, the semaphore count N may be decremented.

The memory 8 stores various programs that have been read from the flash memory 9 by any of CPUs 1 to 3. A volatile memory, such as a synchronous dynamic random access memory (SDRAM), may be used as the memory 8.

The flash memory 9 stores various programs for operations of the mobile terminal device. A control program according to this embodiment is also stored in the flash memory 9. Specific examples of the programs stored in the flash memory 9 include a boot program for starting the CPUs 1 to 3, initial program loaders (IPL) for starting real time operating systems (RTOSs), a handler (e.g., a reset handler) that is activated when the CPUs 1 to 3 are interrupted, and a communication program for implementing communication using LTE (hereinafter referred to as an "LTE program"), a communication program for implementing communication using W-CDMA (hereinafter referred to as a "W-CDMA program"), and a rendezvous program for performing rendezvous processing (described later). Note that the RTOSs are stored in the flash memory 9 separately for the LTE program, for the W-CDMA program, and for the rendezvous program.

The watchdog timers 10 to 12 are associated with the CPUs 1 to 3, respectively. The watchdog timers 10 to 12 each perform counting on the basis of a clock, and then, if a timer count value is not cleared within a predetermined time period, a corresponding one of the watchdog timers 10 to 12 flags one bit of the status register (not illustrated) of the interrupt register 13, 14, or 15 associated therewith. Note that clearance of timer count values of the watchdog timers 10 to 12 is performed by the CPUs 1 to 3 associated the watchdog timers 10 to 12, respectively.

The interrupt registers 13 to 15 are associated with the watchdog timers 10 to 12, respectively. The interrupt registers 13 to 15 include status registers (not illustrated) each composed of a plurality of bits, and interrupt factors are associated with bits of each of the status registers. For example, in the case where the watchdog timer 10 overflows, among bits of the status register of the interrupt register 13 associated with the watchdog timer 10, a bit assigned to a watchdog timer factor is flagged.

The reset release device 16 outputs reset release signals to various hardware components such as the CPUs 1 to 3 on the basis of a power-on signal that is output when a power button of the mobile terminal device is pushed, for example.

(Process Performed Upon Power-on of Mobile Terminal Device)

Figure 2:
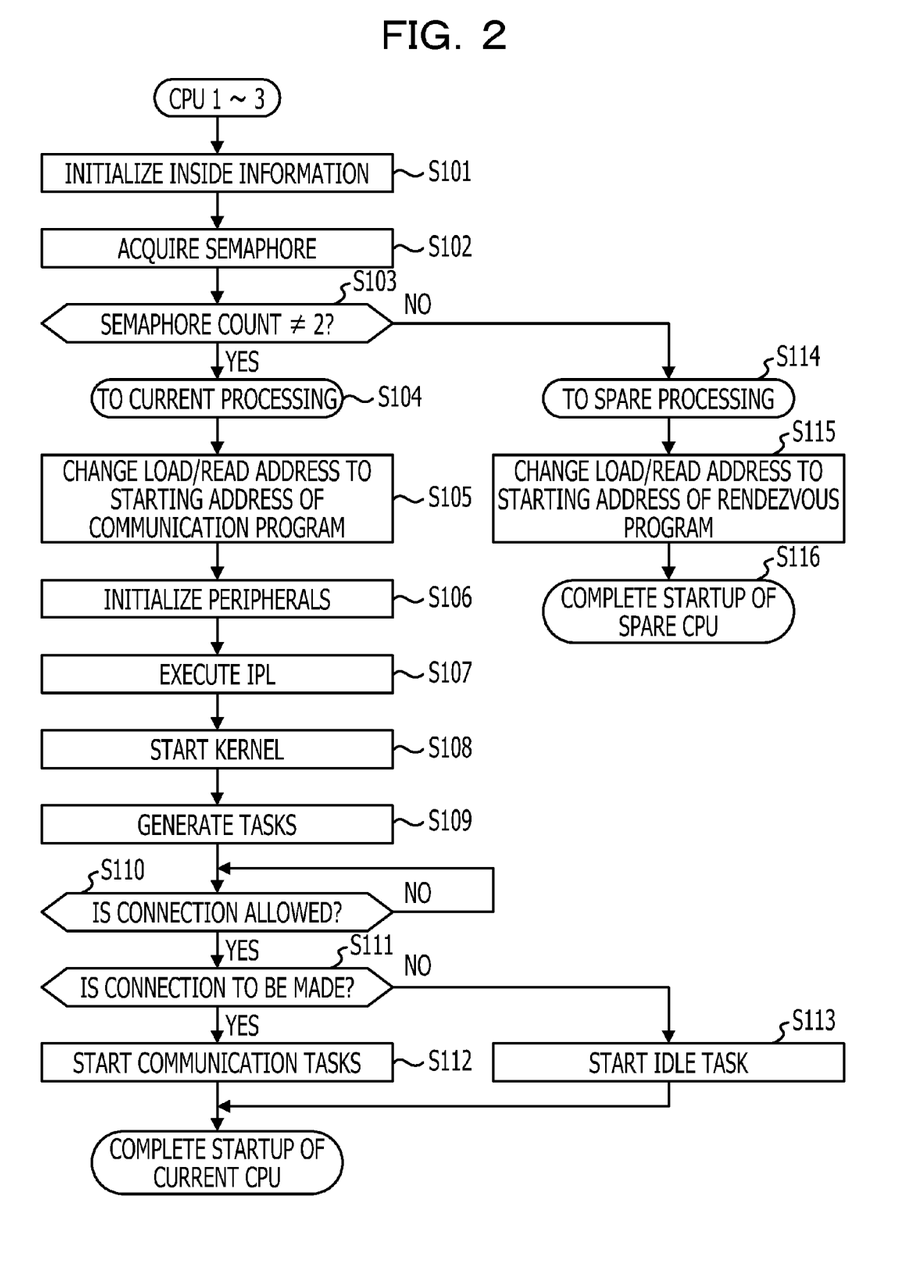
FIG. 2 is a flowchart of a startup process for each CPU that is performed upon power-on of the mobile terminal device according to one embodiment.
Figure 3:
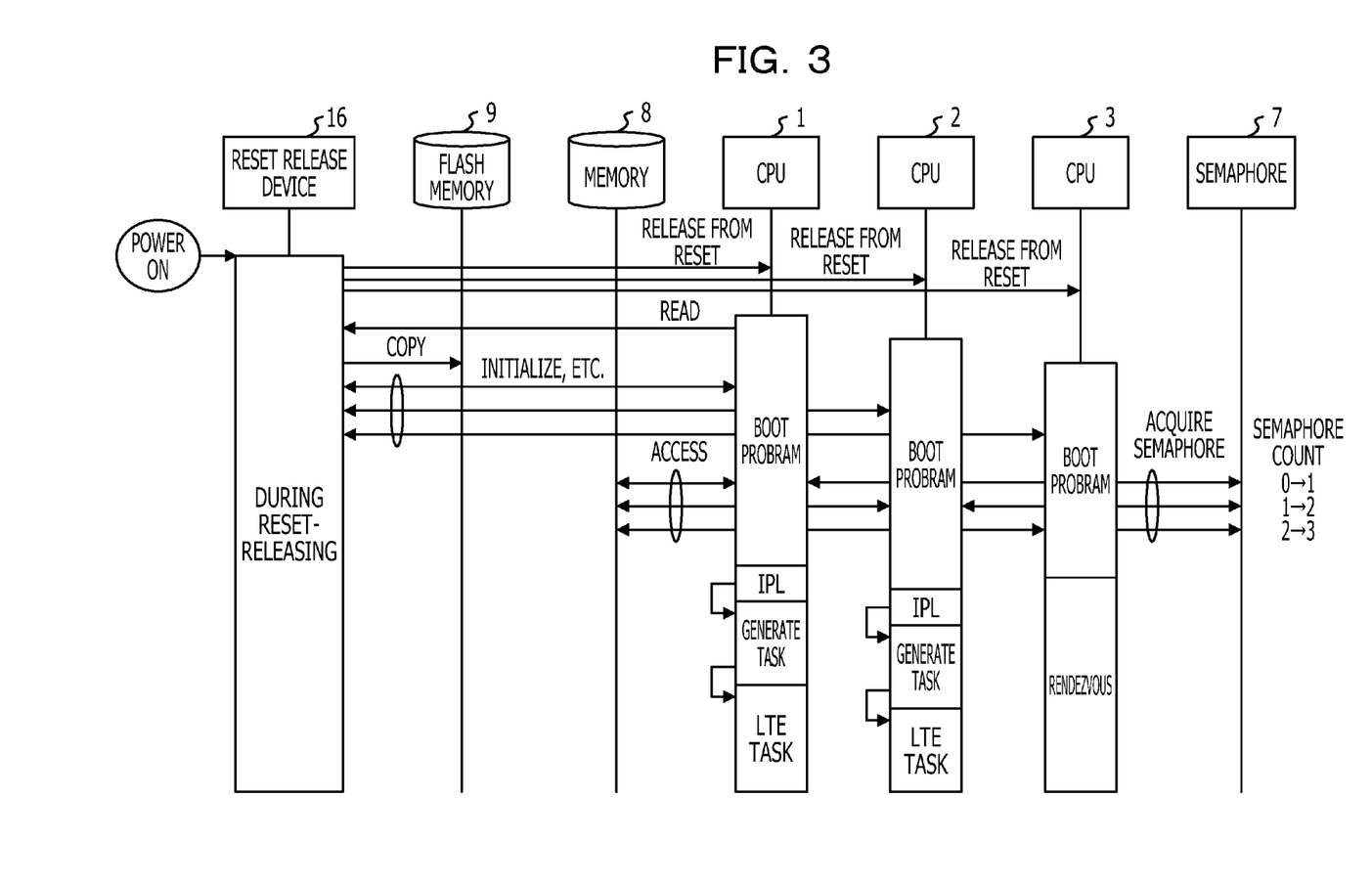
FIG. 3 is a schematic diagram of a sequence of operations upon power-on of the mobile terminal device according to one embodiment.

With reference to FIG. 2 and FIG. 3, a process performed upon power-on of a mobile terminal device will be described next.

FIG. 2 is a flowchart of a startup process for each CPU that is performed upon power-on of the mobile terminal device according to one embodiment. FIG. 3 is a schematic diagram of a sequence of operations upon power-on of the mobile terminal device according to one embodiment.

When a power button of a mobile terminal device is pushed and a reset release signal is given from the reset release device 16 to each of the CPUs 1 to 3, each of the CPUs 1 to 3 accesses the flash memory 9 and initializes inside information of that CPU on the basis of a boot program stored in the flash memory 9 (step S101). For example, initialization of the internal registers 1R to 3R of the CPUs 1 to 3, a bus arbiter (not illustrated), and other components is performed.

A CPU (here the CPU 1) that is the first to access the flash memory 9 copies all the programs stored in the flash memory 9 to the memory 8 on the basis of the boot program. The subsequent CPUs 2 and 3 omit the copy processing.

Although a determination of whether each of the CPUs 1 to 3 performs the copy processing is not particularly limited, on/off information of a flag stored in the flash memory 9, for example, may be used. That is, each of the CPUs 1 to 3 first checks the flag information of the flash memory 9 at the time of execution of the boot program, and may perform the copy processing only when the flag is off.

After the copy processing, the CPU 1 that has performed the copy processing changes an address at which data is loaded and at which data is read (hereinafter referred to as a "load/read address"), from the flash memory 9 to the memory 8. Accordingly, after the copy processing, each of the CPUs 1 to 3 executes the boot program loaded into the memory 8.

Next, on the basis of the boot program loaded in the memory 8, each of the CPUs 1 to 3 accesses the semaphore 7 and performs a semaphore acquisition operation, and increments the semaphore count N by one (step S102).

For example, if the CPU 1 accesses the semaphore 7 when the value of the semaphore count N is a default value "0", the CPU 1 recognizes "0" of the semaphore count N and increments the semaphore count N to "1". When the subsequent CPU 2 accesses the semaphore 7, the CPU 2 recognizes "1" of the semaphore count N and increments the semaphore count N to "2".

However, the maximum of the semaphore count N is set to "2" in this embodiment. Accordingly, when the semaphore count N is "2", each of the CPUs 1 to 3 does not increment the semaphore count N. Accordingly, if the subsequent CPU 3 accesses the semaphore 7, the semaphore count N does not change and remains "2."

A semaphore count is not decremented until the power supply of a mobile terminal device is turned off. For this reason, after the startup of the CPUs 1 to 3, the semaphore count N is maintained at "2" unless the power supply of the mobile terminal device is turned off.

Next, each of the CPUs 1 to 3 determines whether the semaphore count N≠2 (step S103). At this point, if it is determined that the semaphore count N≠2 (Yes in step S103), then each of the CPUs 1 to 3 performs the current processing described below (step S104). If it is determined that the semaphore count is not N≠2 (No in step S103), then each of the CPUs 1 to 3 performs spare processing described below (step S114).

The current processing and the spare processing will be described below.

Now, assuming that the CPU 1 and the CPU 2 perform the current processing and the CPU 3 performs the spare processing, startup processes of a current CPU (a CPU to perform the current processing) and a spare CPU (a CPU to perform the spare processing) are described.

(Startup Process of Current CPU)

After the startup process of the current CPU starts (step S104), each of the CPUs 1 and 2 changes the load/read address to the starting address of the LTE program or the W-CDMA program by using the semaphore count N (step S105). A method of determining the load/read address will be described later.

Then, each of the CPUs 1 and 2 initializes the peripherals of each of the CPUs 1 and 2 on the basis of the LTE program or the W-CDMA program (step S106). At this point, the CPUs 1 and 2 instruct the DSPs 4 and 5 to build a base band signal processing unit for LTE and a base band signal processing unit for W-CDMA. On the basis of instructions from the CPUs 1 and 2, the DSPs 4 and 5 build the base band signal processing unit for LTE and the base band signal processing unit for W-CDMA, respectively.

Then, each of the CPUs 1 and 2 executes the IPL loaded in the memory 8 (step S107) to start the kernel of an RTOS loaded in the memory 8 (step S108). Each of the CPUs 1 and 2 further generates communication tasks for executing the LTE program and the W-CDMA program on the basis of the kernel of the RTOS (step S109).

Then, on the basis of notifications of radio quality from the base band signal processing unit for LTE and the base band signal processing unit for W-CDMA built in the DSPs 4 and 5, each of the CPUs 1 and 2 determines whether a connection using each wireless scheme is allowed (step S110).

If it is determined that the connection using each wireless scheme is not allowed (No in step S110), then each of the CPUs 1 and 2 continues determining whether a connection using each wireless scheme is allowed (step S110). If it is determined that the connection using each wireless scheme is allowed (Yes in step S110), then each of the CPUs 1 and 2 determines whether a connection is to be made using a wireless scheme assigned thereto (step S111). For example, the CPU 1 to which LTE is assigned determines whether a connection using the LTE scheme is to be established.

If it is determined that a connection is to be established using a wireless scheme assigned to each of the CPUs 1 and 2 (Yes in step S111), then that CPU 1 or CPU 2 starts the communication tasks generated in advance (step S112). Thus, the CPU 1, as the current CPU, completes the startup process.

If it is determined that a connection is not to be established using a wireless scheme assigned to each of the CPUs 1 and 2 (No in step S111), then each of the CPUs 1 and 2 starts an idle task (step S113). Thus, the CPU 2, as the current CPU, completes the startup process.

(Startup Process of Spare CPU)

After the startup process of the spare CPU has been started (step S114), the CPU 3 changes the load/read address to the starting address of the rendezvous program by using the semaphore count N (step S115). This causes the CPU 3 to execute the rendezvous program loaded into the memory 8 to start rendezvous processing. A method of determining the load/read address will be described below. Thus, the CPU 3, as the spare CPU, completes the startup process (step S116).

(Method of Determining Load/Read Address)

Figure 4:
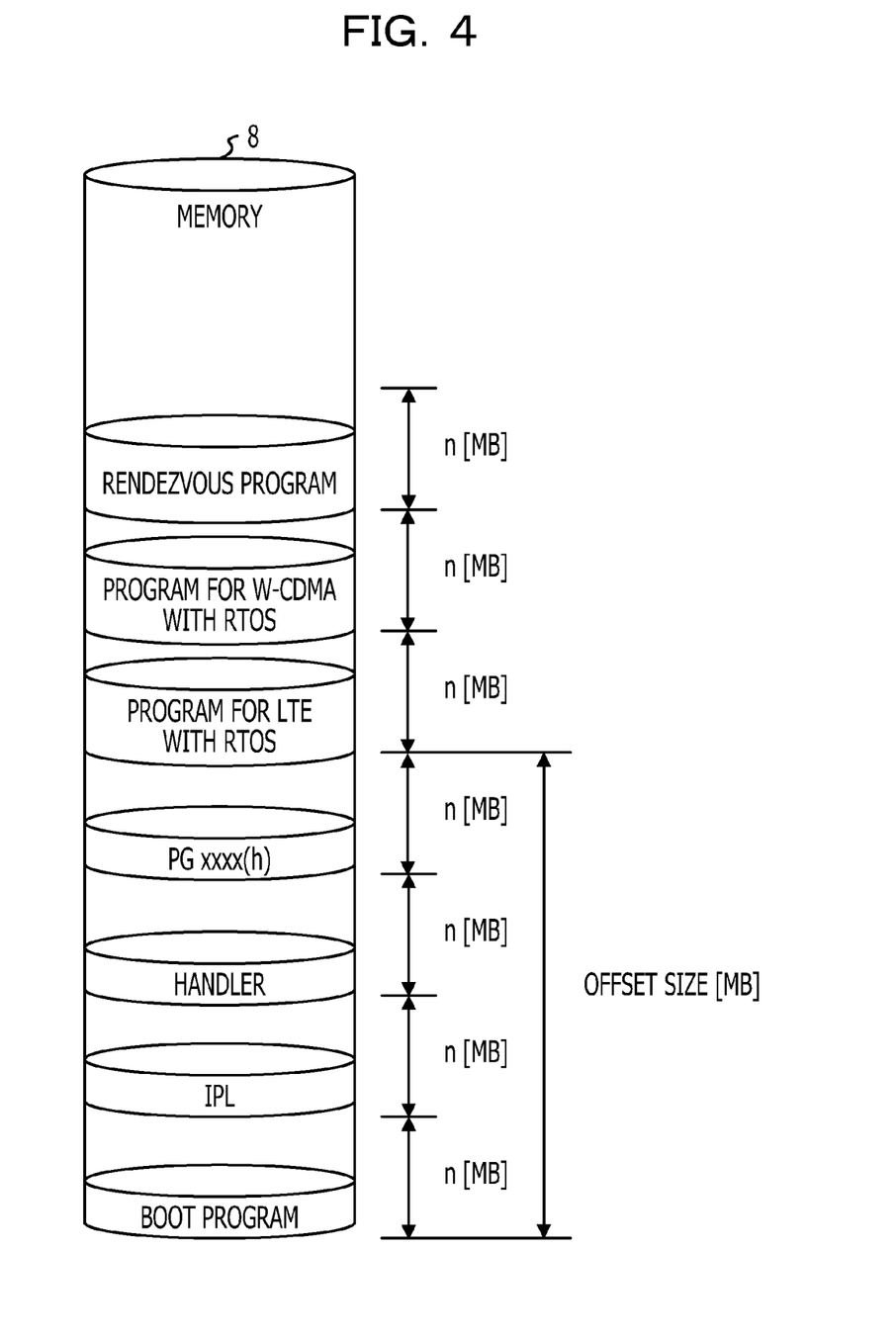
FIG. 4 is a schematic illustration of an address map of a memory according to one embodiment.

Now, with reference to FIG. 4, a description is given of a method of determining an address of the memory 8 at which data is to be read by each of the CPUs 1 to 3.

FIG. 4 is a schematic illustration of an address map of the memory 8 according to one embodiment.

As illustrated in FIG. 4, programs loaded from the flash memory 9 to the memory 8 are stored in memory regions separated by n[MB], for example. The head address of each program may therefore be calculated by substituting an offset size [MB] and the semaphore count N into the following expression.

Starting address=offset size+semaphore count N×region size n     Expression For example, in the case where the CPU 1 is the first to access the semaphore 7, since the semaphore count N is "0", the starting address at which the CPU 1 is to read the program, that is, the load/read address is the offset size [MB]. Thus, the CPU 1 reads the LTE program.

Likewise, in the case where the CPU 2 accesses the semaphore 7, since the semaphore count N is "1", the starting address at which the CPU 2 is to read a program, that is, the load/read address is the offset size [MB]+n [MB]. Thus, the CPU 2 reads the W-CDMA program.

Further, in the case where the CPU 3 subsequently accesses the semaphore 7, since the semaphore count N is "2", the starting address at which the CPU 3 is to read a program, that is, the load/read address is the offset size [MB]+2n [MB]. Thus, the CPU 3 reads the rendezvous program.

(Details of Rendezvous Processing)

Figure 5A:
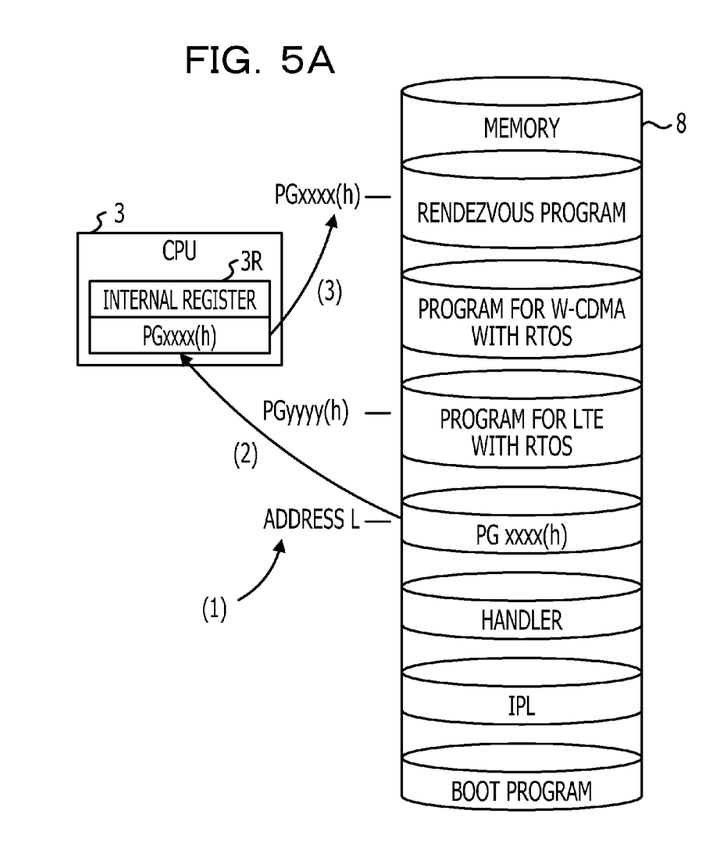
FIGS. 5A and 5B are schematic diagrams illustrating rendezvous processing performed by a spare CPU according to one embodiment.
Figure 5B:
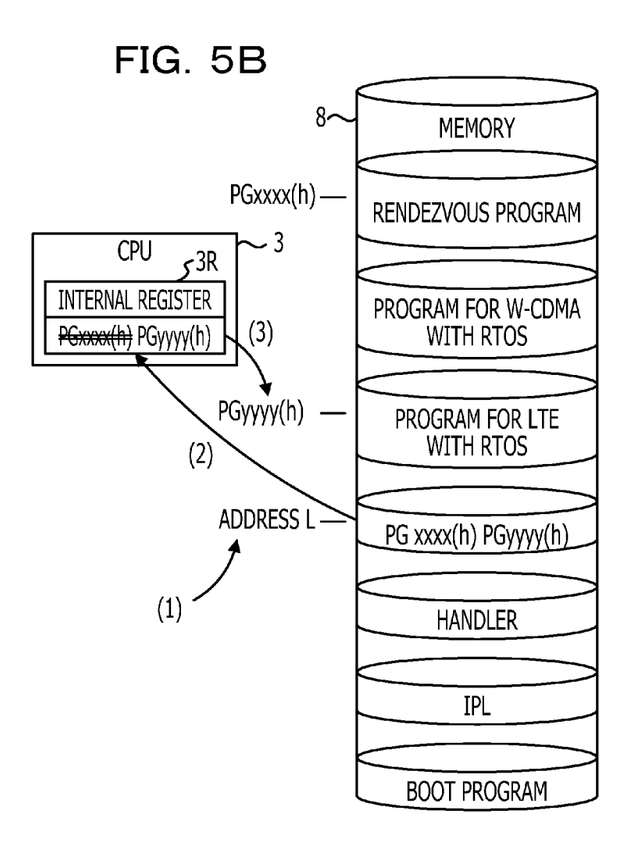

With reference to FIGS. 5A and 5B, details of rendezvous processing will be described next.

FIGS. 5A and 5B are schematic diagrams illustrating rendezvous processing performed by a spare CPU according to one embodiment. FIG. 5A illustrates the processing before rewriting of an address L of the memory 8, and FIG. 5B illustrates the processing after rewriting the address L of the memory 8. Here, assume that the CPU 3 is the spare CPU.

The rendezvous program is a program for causing the spare CPU 3 to perform rendezvous processing, and includes (1) a first process of reading an address stored at the address L of the memory 8, (2) a second process of replacing an address of the memory 8 stored in the internal register 3R with the address stored at the address L of the memory 8, and (3) a third process of reading a program that is stored at the address of the memory 8 stored in the internal register 3R.

Accordingly, in the case where the address stored at the address L of the memory 8 is "PGxxxx(h)", and the address stored in the internal register 3R is "PGxxxx(h)", the rendezvous processing is as follows.

That is, as illustrated in FIG. 5A, first in the first process, the spare CPU 3 reads the address "PGxxxx(h)" stored at the address L of the memory 8.

Then in the second process, the spare CPU 3 replaces the address "PGxxxx(h)" stored in the internal register 3R with the address "PGxxxx(h)" stored at the address L of the memory 8. At this point, since both the address stored at the address L of the memory 8 and the address stored in the internal register 3R are "PGxxxx(h)", the address stored in the internal register 3R is still "PGxxxx(h)."

Then in the third process, the spare CPU 3 reads a program stored at the address stored in the internal register 3R, that is, the address "PGxxxx(h)" of the memory 8. The program stored at the address "PGxxxx(h)" of the memory 8 is the rendezvous program. Accordingly, the spare CPU 3 executes the rendezvous program again.

If the address "PGxxxx(h)" stored at the address L of the memory 8 is replaced with "PGyyyy(h)" while the rendezvous program is being repeated, then the rendezvous processing becomes as follows.

That is, as illustrated in FIG. 5B, first in the first process, the spare CPU 3 reads the address "PGyyyy(h)" stored at the address L of the memory 8.

Then in the second process, the spare CPU 3 replaces the address "PGxxxx(h)" stored in the internal register 3R with the address "PGyyyy(h)" stored at the address L of the memory 8.

Then in the third process, the spare CPU 3 reads a program stored at the address stored in the internal register 3R, that is, the address "PGyyyy(h)" of the memory 8. The program stored at the address "PGyyyy(h)" of the memory 8 is the LTE program. Accordingly, the spare CPU 3 executes the LTE program, instead of the rendezvous program that has been executed.

(Change Process of CPUs 1 to 3)

Figure 6:
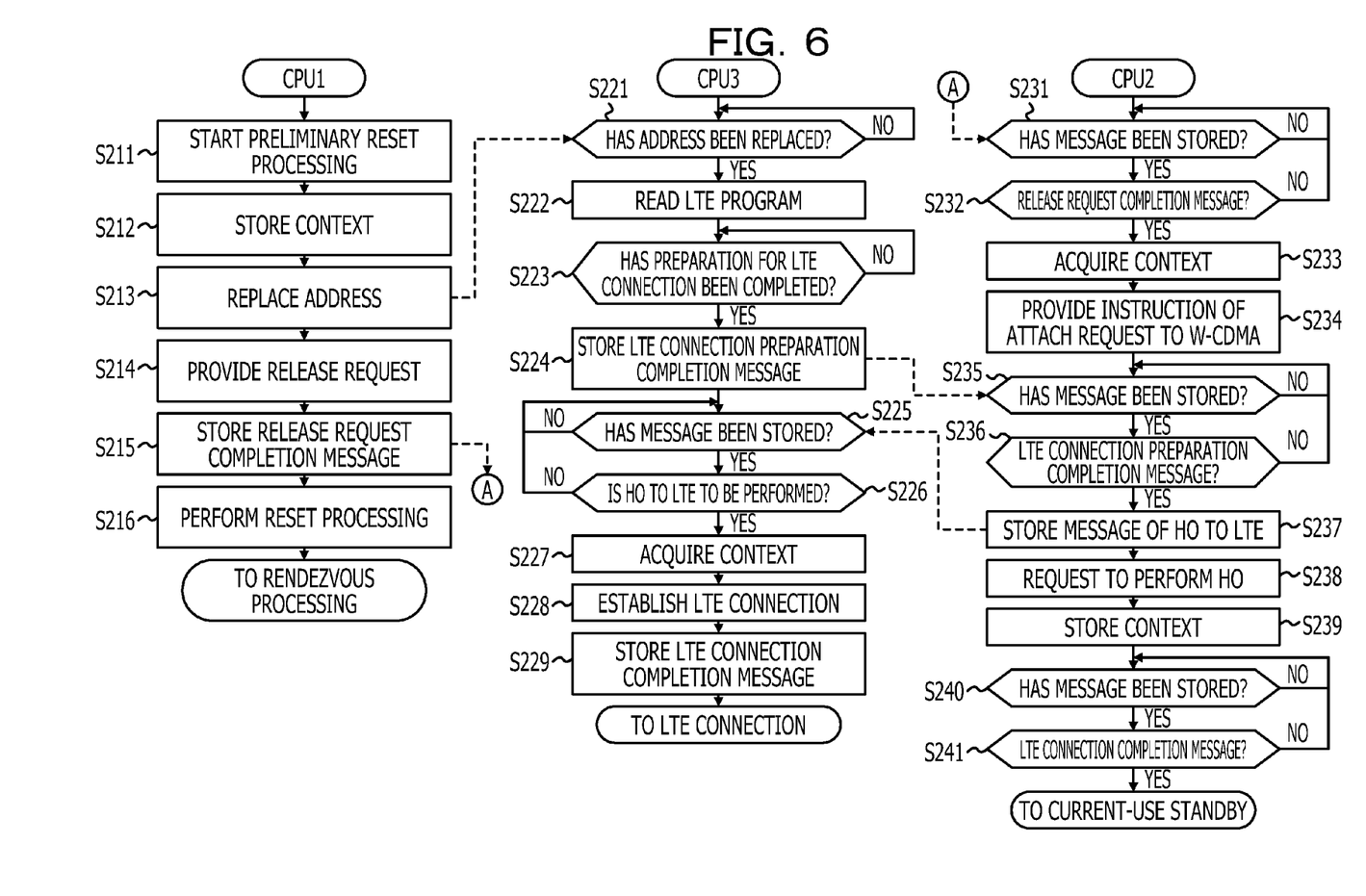
FIG. 6 is a flowchart of a change process of each CPU performed upon occurrence of an interrupt, which triggers reset processing, in a CPU for LTE according to one embodiment.
Figure 7:
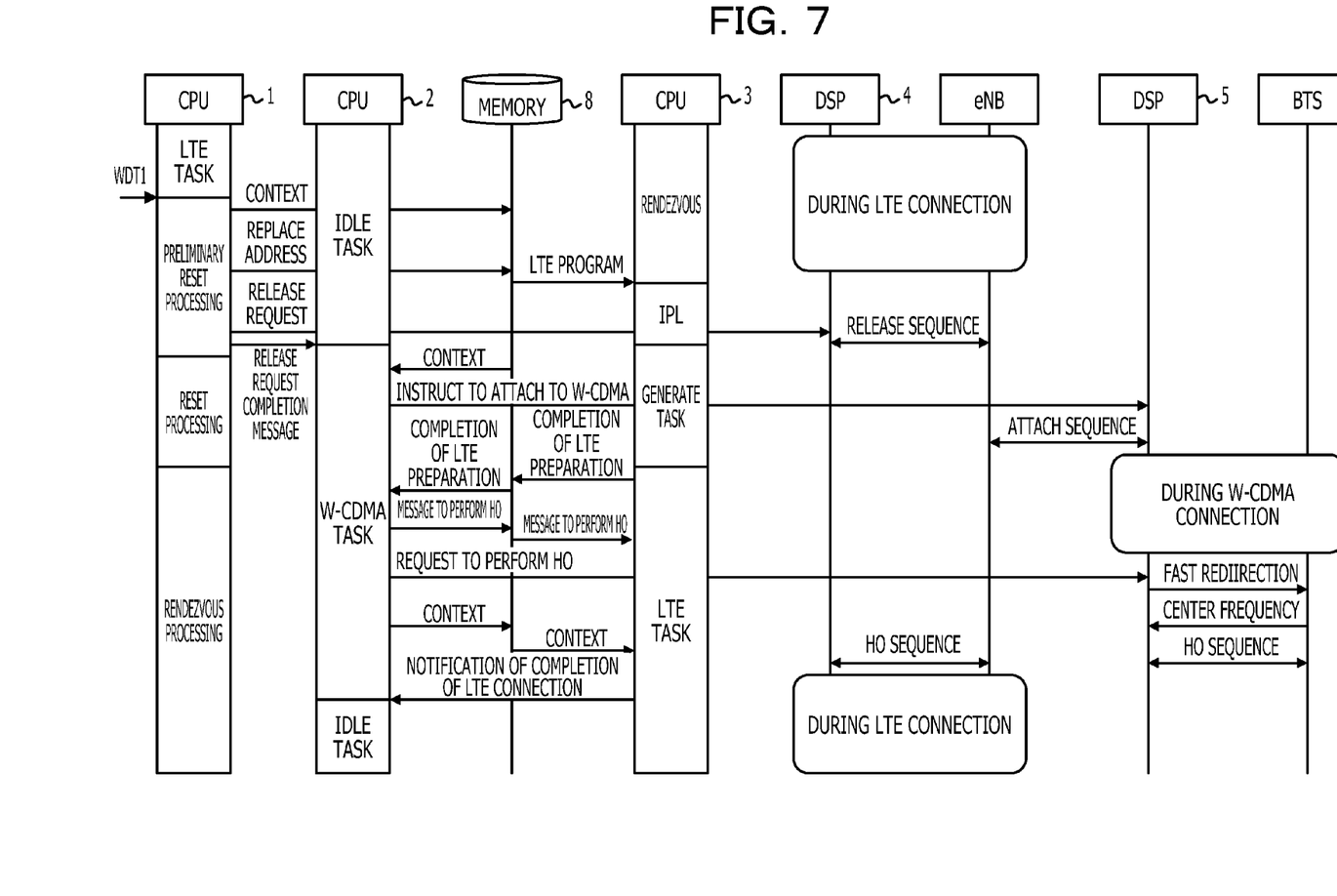
FIG. 7 is a schematic diagram of a sequence of operations upon occurrence of an interrupt, which triggers reset processing, in the CPU for LTE according to one embodiment.

With reference to FIG. 6 and FIG. 7, a change process that is performed by each of the CPUs 1 to 3 when the CPU 1 starts reset processing will be described next.

FIG. 6 is a flowchart of a change process of each of the CPUs 1 to 3. The change process is performed upon occurrence of an interrupt, which triggers reset processing, in the CPU 1 for LTE according to one embodiment. FIG. 7 is a schematic diagram of a sequence of operations upon occurrence of an interrupt, which triggers reset processing, in the CPU 1 for LTE according to one embodiment.

If the watchdog timer 10 overflows during an LTE connection, that is, while the CPU 1 for LTE is performing an LTE task, the CPU 1 executes a reset handler stored in the memory 8, starting a preliminary reset processing as illustrated in FIG. 6 and FIG. 7 (step S211).

In the preliminary reset processing, the CPU 1 stores a packet data protocol (PDP) context (line setting information) of the LTE connection at a predetermined address of the memory 8 (step S212). The PDP context includes addresses of nodes on a packet transfer path, quality of service (QoS) parameters (such as capacity, error characteristics, and delay), and information for determination as to what internet protocol (IP) flow is to be transferred, for example.

Then, the CPU 1 replaces the address "PGxxxx(h)" stored at the address L in the internal register 3R with the address "PGyyyy(h)" of the memory 8 at which the LTE program is stored (step S213).

Then, the CPU 1 notifies the base band signal processing unit built in the DSP 4 of a release request (step S214). On the basis of the release request from the CPU 1, the base band signal processing unit of the DSP 4 performs a release sequence between the mobile terminal device and a base station (Evolved Node B: eNB), thereby disconnecting the LTE connection.

Then, the CPU 1 stores a release request completion message at a predetermined address of the memory 8 (step S215). The release request completion message indicates completion of notification of a release request.

Up to this point, the preliminary reset processing has been completed.

Next, the CPU 1 performs reset processing (step S216).

In the reset processing, the CPU 1 reads the boot program stored in the flash memory 9, and performs a startup sequence in the same manner as at the startup time of the mobile terminal device. In the starting sequence, the CPU 1 accesses the semaphore 7. At this point, since the semaphore count N is "2", the CPU 1 performs the above-mentioned spare processing to perform the startup process as a spare CPU. Accordingly, the CPU 1, as a spare CPU, performs rendezvous processing.

On the basis of the W-CDMA program, the CPU 2 determines whether a message has been stored at the predetermined address of the memory 8 (step S231). At this point, if it is determined that a message has been stored in the memory 8 (Yes in step S231), then the CPU 2 determines whether the message is a release request completion message (step S232).

At this point, if it is determined that the message is a release request completion message (Yes in Step S232), then the CPU2 acquires a PDP context from the memory 8 (step S233), and instructs the base band signal processing unit in the DSP 5 of an attach request to W-CDMA (step S234).

The base band signal processing unit in the DSP 5, which has been instructed of the attach request, performs an attach sequence between that base band signal processing unit and a base station (Base Transceiver Station: BTS), thereby starting communication using a W-CDMA connection between the mobile terminal device and the base station (BTS).

If it is determined that a message has not been stored in the memory 8 (No in step S231), or if it is determined that the message is not a release request completion message (No in step S232), then the CPU 2 continues message monitoring (step S231).

The CPU 3 performs rendezvous processing at the beginning. If "PGxxxx(h)" stored at the address L of the memory 8 has been replaced with the address "PGyyyy(h)" at which the LTE program is stored (Yes in step S221), then the CPU 3 reads the LTE program (step S222), and starts preparation for an LTE connection.

Then, the CPU 3 determines whether the preparation for an LTE connection has been completed (step S223). If it is determined that the preparation for LTE connection has not been completed (No in step S223), then the CPU 3 continues determining whether the preparation for an LTE connection has been completed (step S223).

If it is determined that the preparation for an LTE connection has been completed (Yes in step S223), then a message that the preparation for an LTE connection has been completed (hereinafter referred to as an "LTE connection preparation completion message") is stored at the predetermined address of the memory 8 (step S224).

After the instruction of an attach request to W-CDMA (step S234), the CPU 2 determines whether a message has been stored at the predetermined address of the memory 8 (step S235). If it is determined that the message has been stored at the predetermined address of the memory 8 (Yes in step S235), then the CPU 2 determines whether the message is the LTE connection preparation completion message (step 236).

At this point, if it is determined that the message is the LTE connection preparation completion message (Yes in step S236), then the CPU 2 stores a message to perform a handover (HO) at the predetermined address of the memory 8 (step S237).

Then, the CPU 2 notifies the base band signal processing unit in the DSP 5 of a request to perform a handover (step S238). On the basis of the request to perform a handover from the CPU 2, the base band signal processing unit in the DSP 5 notifies the base station (BTS) of a fast redirection instruction. On the basis of the fast redirection instruction from the DSP 5, the base station (BTS) notifies the base band signal processing unit in the DSP 5 of the center frequency of an LTE connection, for example.

Then, the CPU 2 stores a PDP context at the predetermined address of the memory 8 (step S239). The PDP context includes the center frequency of the LTE connection from the base station (BTS), for example.

Note that an address at which the PDP context is to be stored does not have to be determined in advance. When such a storing address is not determined in advance, however, the CPU 2 notifies the CPU 3 of the storage address at a time when the CPU 2 stores the PDP context. The same applies to passing of other messages.

If it is determined that the message has not been stored at the predetermined address of the memory 8 (No in step S235), or if it is determined that the message is not the LTE connection preparation completion message (No in step S236), then the CPU 2 continues message monitoring (step S235).

After storing the LTE connection preparation completion message (step S224), the CPU 3 determines whether a message has been stored at the predetermined address of the memory 8 (step S225).

If it is determined that a message has been stored at the predetermined address of the memory 8 (Yes in step S225), then the CPU 3 determines whether that message is a message to perform a handover (step 226).

At this point, if it is determined that that message is a message to perform a handover (Yes in step S226), then the CPU 3 acquires the PDP context stored at the predetermined address of the memory 8 (step S227).

Then, the CPU 3 performs a handover sequence between the mobile terminal device and a base station (LTE) using the acquired PDP context, thereby establishing an LTE connection (step S228), and stores a message that an LTE connection has been completed (hereinafter referred to as an "LTE connection completion message" at a predetermined address of the memory 8 (step S229).

After storing the PDP context (step S239), the CPU 2 determines whether a message has been stored at the predetermined address of the memory 8 (step S240). If it is determined that a message has been stored at the predetermined address of the memory 8 (Yes in step S240), then the CPU 2 determines whether that message is the LTE connection completion message (step 241).

At this point, if it is determined that that message is the LTE connection completion message (Yes in step S241), then the CPU 2, as the current CPU of W-CDMA, starts an idle task, and proceeds to a current-use standby mode.

If it is determined that a message has not been stored in the memory 8 (No in step S240), or if it is determined that the message has not been the LTE connection completion message (No in step S241), then the CPU 2 continues message monitoring (step S240).

As described above, according to this embodiment, when an interrupt that triggers reset processing occurs in the CPU 1 while the CPU 1 is executing the LTE program for an LTE connection, a direct shift of the LTE connection from the CPU 1 to the spare CPU 3 is not made. Instead, a temporary change to a W-CDMA connection is made.

Accordingly, the CPU 3 may make a preparation for an LTE connection during a W-CDMA connection, and therefore stopping of communication due to a time of preparation for the LTE connection may be inhibited. Accordingly, various types of data transmission such as streaming and telephone calls are less likely to be discontinued, and thus a user is not stressed.

Note that there is a nominal stopping time when a change is made from an LTE connection to a W-CDMA connection. The stopping time is far shorter than a stopping time that occurs when the LTE connection is directly changed from the CPU 1 to the spare CPU 3, and therefore a user does not realize that communication is temporarily stopped.

The CPU 1 stores a PDP context (bearer) of the LTE connection at the predetermined address of the memory 8, as the preliminary reset processing. The CPU 2 may therefore succeed the communication connection that has been realized by the CPU 1 and may start a W-CDMA connection by acquiring the PDP context at the predetermined address of the memory 8.

Furthermore, according to this embodiment, the spare CPU 3, not the CPU 1, is used when the LTE connection is started again after the W-CDMA connection. For this reason, if an interrupt that triggers reset processing arises from a hardware failure of the CPU 1, the CPU 1 under the hardware failure is inhibited from implementing an LTE connection. This enables more stable data transfer to be achieved.

Note that while the CPUs 1 to 3 are used in this embodiment, the present disclosure is not limited to this, and more CPUs may be used. For example, one CPU may be added and wireless schemes such as Global System for Mobile Communications, that is, GSM (registered trademark) may be assigned to the CPU.

In this embodiment, when a change is made from the W-CDMA connection to the LTE connection, a shift of the LTE connection to the spare CPU 3 is made. However, the present disclosure is not limited to this. For example, when a change is made from the W-CDMA connection to the LTE connection, the LTE connection may be again assigned to the CPU 1. When the LTE connection is assigned to the CPU 1, the spare CPU 3 may be removed. At this point, assuming that the maximum of the semaphore count N is "1", the CPU 1 will execute the LTE program after reset processing.

While a plurality of CPUs are used in this embodiment, so-called a multi-core CPU in which a plurality of cores are mounted, for example, may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mobile terminal device comprising:
a first processor; and
a second processor;
wherein the first processor executes a first process for communication using a first wireless scheme and outputs line setting information for the communication using the first wireless scheme before performing a reset process when an interrupt request that triggers the reset process occurs in the first processor during the communication using the first wireless scheme, and wherein the second processor executes a second process for communication using a second wireless scheme and outputs a connection request for the communication using the second wireless scheme when the second processor acquires the line setting information from the first processor.

2. The mobile terminal device according to claim 1, further comprising:

a memory that stores the line setting information output from the first processor, wherein the second processor acquires the line setting information stored in the memory when the interrupt request occurs in the first processor during the communication using the first wireless scheme.

3. The mobile terminal device according to claim 1, wherein the first processor outputs a request for stopping the communication using the first wireless scheme when the interrupt request occurs in the first processor during the communication using the first wireless scheme.

4. The mobile terminal device according to claim 1, wherein the first processor executes the reset process after the line setting information is output.

5. The mobile terminal device according to claim 1, wherein the first processor executes the reset process after the connection request is output.

6. The mobile terminal device according to claim 1, further comprising:

a third processor that generates a task of the first process when the interrupt request occurs in the first processor during the communication using the first wireless scheme, wherein the second processor outputs a connection request for communication using the first wireless scheme after the task of the first process is generated.

7. The mobile terminal device according to claim 6, further comprising:

a memory that stores a communication program defining the first process, wherein the third processor generates the task of the first process based on the communication program stored in the memory when the interrupt request occurs in the first processor during the communication using the first wireless scheme.

8. The mobile terminal device according to claim 3, wherein the first processor outputs a notification of completion of the request for stopping communication using the first wireless scheme, and wherein the second processor outputs the connection request for the communication using the second wireless scheme in response to the notification of completion output from the first processor.

9. A controlling method for a mobile terminal device including a first processor and a second processor, the method comprising:

causing the first processor to execute a first process for communication using a first wireless scheme and output line setting information for the communication using the first wireless scheme before performing a reset process when an interrupt request that triggers the reset process occurs in the first processor during the communication using the first wireless scheme, and causing the second processor to execute a second process for communication using a second wireless scheme and output a connection request for the communication using the second wireless scheme when the second processor acquires the line setting information from the first processor.

* * * * *